US011979728B2

(12) United States Patent
Toita

(10) Patent No.: US 11,979,728 B2
(45) Date of Patent: May 7, 2024

(54) SPEAKER

(71) Applicant: Alps Alpine Co., LTD, Tokyo (JP)

(72) Inventor: Hiroki Toita, Fukushima (JP)

(73) Assignee: ALPS ALPINE CO., LTD, Tokyo (JP)

( * ) Notice: Subject to any disclaimer, the term of this patent is extended or adjusted under 35 U.S.C. 154(b) by 93 days.

(21) Appl. No.: 17/734,281

(22) Filed: May 2, 2022

(65) Prior Publication Data

US 2022/0312123 A1 Sep. 29, 2022

(30) Foreign Application Priority Data

Mar. 25, 2021 (JP) ................................ 2021-051729

(51) Int. Cl.
*H04R 9/06* (2006.01)
*H04R 3/00* (2006.01)
*H04R 9/02* (2006.01)
*H04R 9/04* (2006.01)

(52) U.S. Cl.
CPC ............. *H04R 9/027* (2013.01); *H04R 3/002* (2013.01); *H04R 9/025* (2013.01); *H04R 9/043* (2013.01); *H04R 9/046* (2013.01); *H04R 9/06* (2013.01); *H04R 2209/022* (2013.01); *H04R 2400/11* (2013.01)

(58) Field of Classification Search
CPC . H04R 1/34; H04R 3/002; H04R 9/02; H04R 9/025; H04R 9/027; H04R 9/043; H04R 9/046; H04R 9/06; H04R 2209/022; H04R 2201/34; H04R 2400/11
See application file for complete search history.

(56) References Cited

U.S. PATENT DOCUMENTS 4,256,923 A * 3/1981 Meyers .................. H04R 3/002 381/96
4,821,328 A * 4/1989 Drozdowski .......... H04R 3/002 381/59
6,574,346 B1 6/2003 Tanaka
7,684,582 B2 * 3/2010 Gladwin .................. H04R 7/26 381/337
2022/0312135 A1 * 9/2022 Tachi .................. H04R 29/001

FOREIGN PATENT DOCUMENTS

| | | |
|---|---|---|
| DE | 32 37 262 C1 | 10/1983 |
| EP | 0107777 | 5/1984 |
| EP | 1049353 A2 | 11/2000 |
| JP | 57-184397 | 11/1982 |
| JP | 2000-308174 A | 11/2000 |

OTHER PUBLICATIONS

Written Opinion of the International Searching Authority from corresponding International Application No. PCT/JP2022/017856, dated Jul. 12, 2022, 15 pp.
Extended European Search Report from corresponding European Application No. 22168462.4, dated Oct. 12, 2022, 14 pgs.

* cited by examiner

*Primary Examiner* — Huyen D Le
(74) *Attorney, Agent, or Firm* — Crowell & Moring LLP

(57) ABSTRACT

A vibrating unit includes a diaphragm and a bobbin, and a voice coil is secured to the bobbin. A detecting unit includes a moving magnet and a magnetic sensor. The magnetic sensor is disposed in a space surrounded by the bobbin, whereas the moving magnet is secured to an outer surface of the bobbin. Therefore, even when the moving magnet and a damper member move backward significantly, the magnetic sensor is prevented from being hit by the moving magnet and the damper member.

11 Claims, 4 Drawing Sheets

SPEAKER

RELATED APPLICATION

The present application claims priority to Japanese Patent Application Number 2021-051729, filed Mar. 25, 2021, the entirety of which is hereby incorporated by reference.

BACKGROUND

1. Field of the Invention

The present invention relates to a speaker that is capable of detecting, with a magnetic sensor, the operation of a vibrating unit including a diaphragm and a bobbin.

2. Description of the Related Art

Speakers for acoustic systems according to the related art are configured only to perform processing which involves simply receiving an audio signal output from an amplifier and reproducing sound pressure. That is, since the speakers are not configured to perform a control operation in accordance with an audio signal, the resulting sound tends to be distorted and the sound quality tends to vary. Additionally, when the amplitude of a diaphragm is excessively large, the diaphragm or a damper may be damaged.

As a solution to the problems described above, JP 57-184397 A discloses a speaker system that is configured to perform feedback control by detecting the movement of a diaphragm with a magnetic sensor.

The speaker system includes a Hall element serving as a magnetic sensor. At a position opposite a voice coil, the Hall element is supported by a plate constituting a magnetic circuit unit. An effective magnetic flux density inside a gap in the magnetic circuit unit is detected by the Hall element, and the detection signal is amplified and sent as feedback to a power amplifier. When a driving current applied from the power amplifier to the voice coil causes a bobbin to vibrate together with the voice coil, the effective magnetic flux density in the gap is changed by current flowing in the voice coil and counter-electromotive force generated in the voice coil. The change in the effective magnetic flux density is detected by the Hall element and sent as feedback to the power amplifier, so that distortion in the driving current applied to the voice coil is corrected.

In the feedback control performed in the speaker system disclosed in JP 57-184397 A, the Hall element smaller than an optical detector element and a coil is used as a detector element. This prevents an excessive increase in the size of the speaker and prevents an increase in power consumption. With the technique in which the Hall element detects a change in the effective magnetic flux density inside the gap in the magnetic circuit unit, however, the movement of the voice coil and the bobbin cannot be directly detected. This makes it difficult to highly precisely correct sound distortion and variation in sound quality.

The speaker system disclosed in JP 57-184397 A has a structure in which the Hall element is embedded in a surface of the plate facing the voice coil. The Hall element has a complex installation structure and cannot be assembled efficiently. If the Hall element is attached to the upper surface (in the drawing) of the plate, the Hall element cannot fully detect a change in the effective magnetic flux density inside the gap in the magnetic circuit unit. Additionally, the vibrating diaphragm and a damper member that supports the diaphragm tend to hit the Hall element.

The present disclosure has been made to solve the problems of the related art described above. An object of the present disclosure is to provide a speaker that is capable of highly precisely detecting vibration of a vibrating unit.

SUMMARY

A speaker according to an aspect of the present disclosure includes a frame, a vibrating unit, a magnetic driving unit, and a detecting unit. The vibrating unit is supported by the frame. The vibrating unit includes a diaphragm and a bobbin secured to the diaphragm. The diaphragm is supported by the frame in such a way as to freely vibrate. The magnetic driving unit is configured to drive the vibrating unit. The magnetic driving unit includes a voice coil secured to the bobbin and a magnetic circuit unit configured to form a magnetic flux travelling across the voice coil. The detecting unit is configured to detect movement of the vibrating unit. The detecting unit includes a moving magnet secured to the vibrating unit and a magnetic sensor configured to detect a magnetic flux generated from the moving magnet. The magnetic sensor is secured in a space surrounded by the bobbin.

In the speaker according to the aspect of the present disclosure, for example, a base may be secured to an end face of a center yoke constituting the magnetic circuit unit, and the magnetic sensor may be secured to the base at a distance from the end face.

In the speaker according to the aspect of the present disclosure, a phase plug may be secured to an end face of a center yoke constituting the magnetic circuit unit, and the magnetic sensor may be secured to the phase plug at a distance from the end face.

In the speaker according to the aspect of the present disclosure, a tweeter may be secured to an end face of a center yoke constituting the magnetic circuit unit, and the magnetic sensor may be secured to the tweeter at a distance from the end face.

In the speaker according to the aspect of the present disclosure, a center yoke constituting the magnetic circuit unit preferably has a hole formed therethrough in a vibrating direction of the vibrating unit, and a distribution cable connected to the magnetic sensor preferably passes through the hole and extends out of the magnetic circuit unit.

In the speaker according to the aspect of the present disclosure, a direction of a driving magnetic flux applied from the magnetic circuit unit to the magnetic sensor preferably cross a direction of a moving magnetic flux applied from the moving magnet to the magnetic sensor, and the magnetic sensor preferably provides a detection output based on a change in a direction of a composite vector of the driving magnetic flux and the moving magnetic flux.

In the speaker according to the aspect of the present disclosure, the moving magnet is preferably disposed outside the bobbin.

In the speaker according to the aspect of the present disclosure, the magnetic sensor detects a magnetic flux from the moving magnet disposed on the vibrating unit. The movement of the vibrating unit can thus be directly detected. This enables highly precise feedback control for correcting the operation of the vibrating unit. The magnetic sensor provides a detection output based on a change in magnetic field represented by a composite vector of the driving magnetic flux from the magnetic circuit unit and the moving magnetic flux from the moving magnet. The movement of the vibrating unit can thus be detected with high precision, regardless of the intensity of the driving magnetic flux generated from the magnetic circuit unit.

The magnetic sensor is disposed in a space surrounded by the bobbin. The magnetic sensor can thus be positioned regardless of the position of, for example, the damper member that vibrates back and forth outside the bobbin. A high degree of freedom in positioning the magnetic sensor can thus be ensured. For example, the magnetic sensor can be disposed at a distance from the magnetic circuit unit and closer to the moving magnet. When the magnetic sensor is disposed at a distance from the magnetic circuit unit, the moving magnet can also be disposed at a distance from the voice coil. Accordingly, when the moving magnet is disposed outside the bobbin and the vibrating unit vibrates, the moving magnet can be prevented from hitting the magnetic circuit unit.

DETAILED DESCRIPTION OF THE PREFERRED EMBODIMENTS

Figure 1:
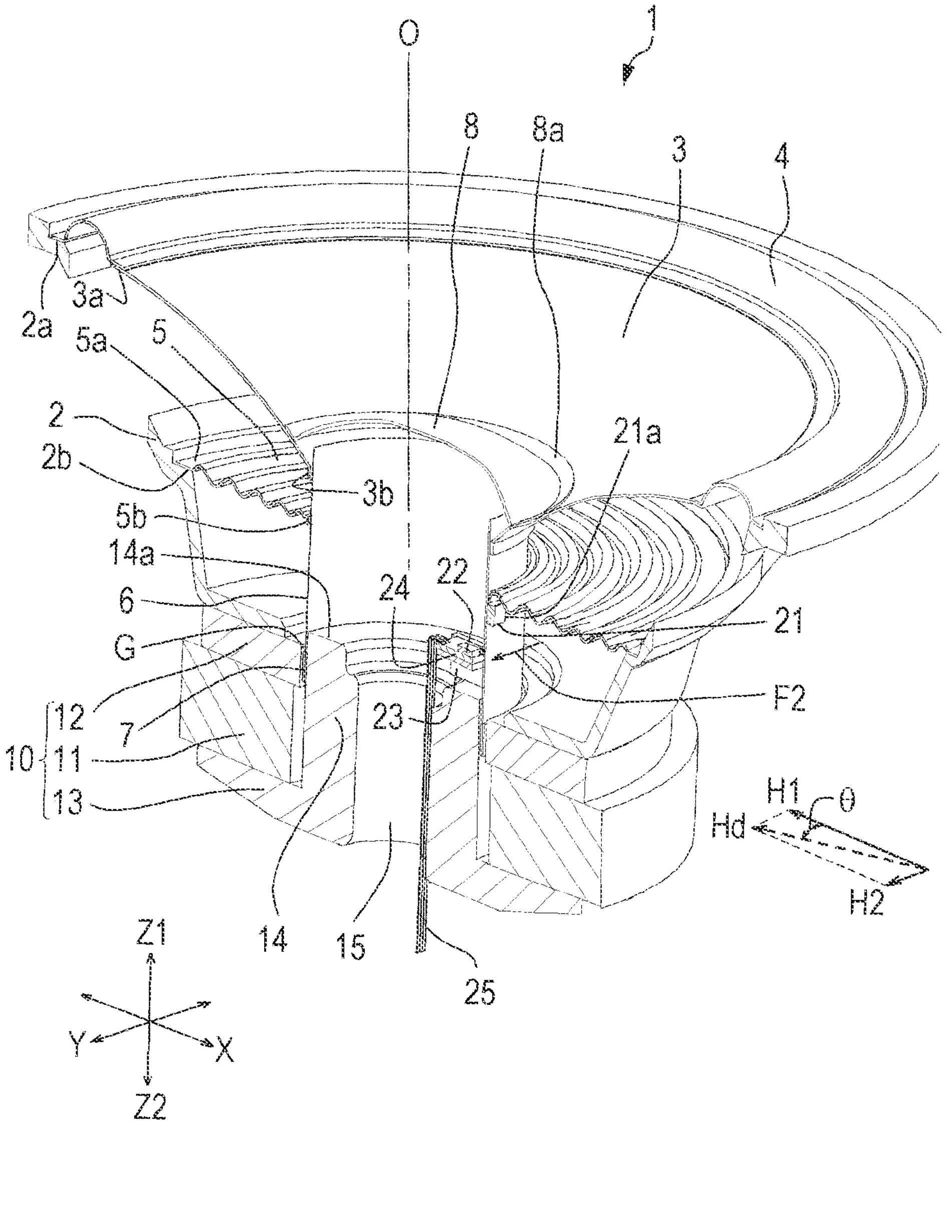
FIG. 1 is a half sectional perspective view of a speaker according to a first embodiment of the present invention.
Figure 2:
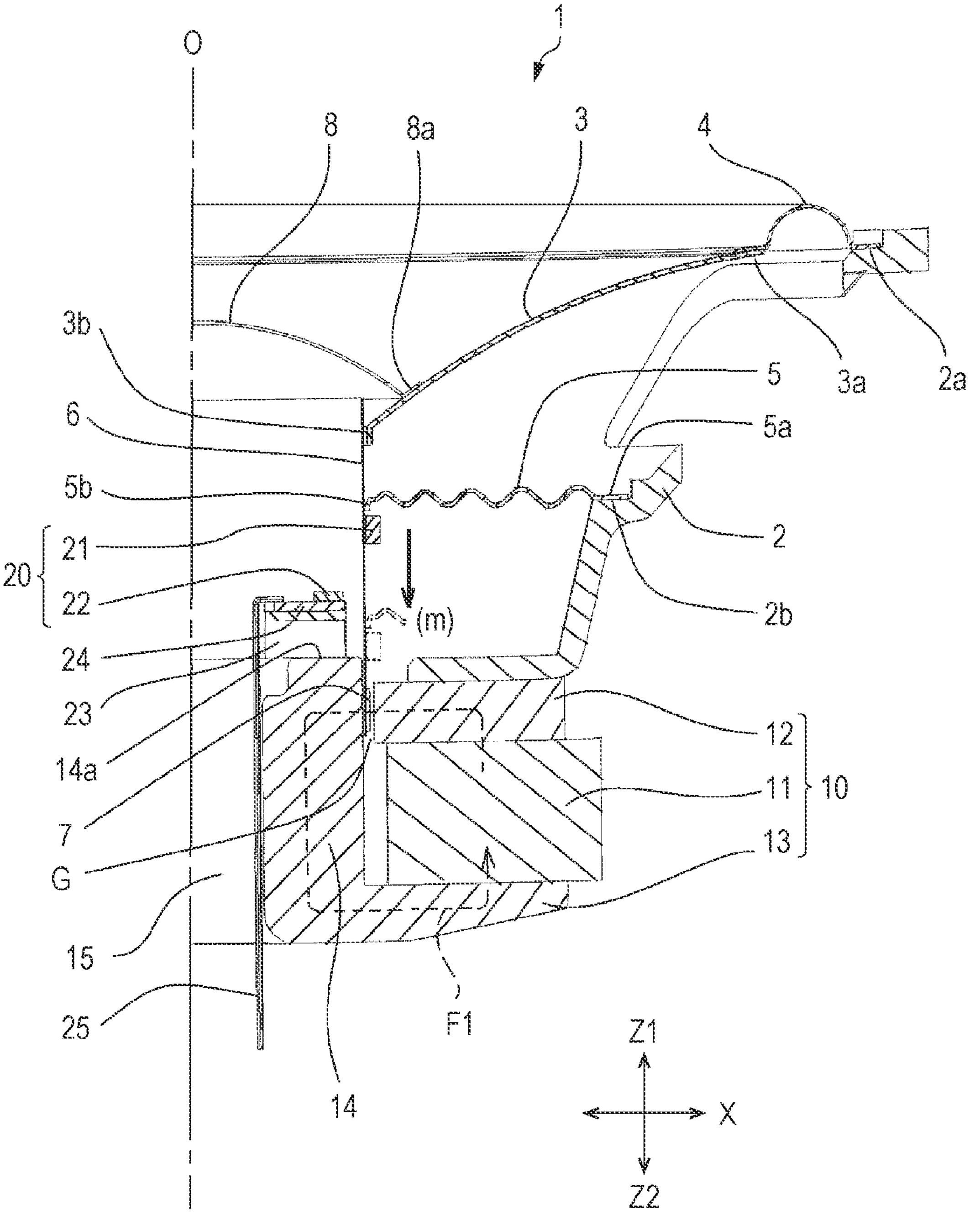
FIG. 2 is a half sectional view of the speaker according to the first embodiment.

FIG. 1 and FIG. 2 illustrate a speaker 1 according to a first embodiment of the present invention. In the speaker 1, a Z1-Z2 direction is a front-back direction, a Z1 direction is a forward and sound output direction, and a Z2 direction is a backward direction. FIG. 1 and FIG. 2 show a central axis O extending in the front-back direction (Z1-Z2 direction). A main part of the speaker 1 has a substantially rotationally symmetrical structure centered on the central axis O. FIG. 1 shows an X axis and a Y axis orthogonal to each other in a plane orthogonal to the central axis O. The X axis coincides with the direction of a magnetic field H1 in a driving magnetic flux F1 formed by a magnetic circuit unit 10, whereas the Y axis coincides with the direction of a magnetic field H2 in a moving magnetic flux F2 formed by a moving magnet 21. The magnetic field H1 and the magnetic field H2 are to be detected by a magnetic sensor 22.

The speaker 1 illustrated in FIG. 1 and FIG. 2 includes a frame 2. The frame 2 is formed of a non-magnetic material or a magnetic material. The frame 2 has a tapered shape with a diameter that gradually increases toward the front (the Z1 direction). The magnetic circuit unit 10 is secured to the back of the frame 2, for example, by bonding or with screws. The magnetic circuit unit 10 includes an annular driving magnet 11 centered on the central axis O, an annular counter yoke 12 joined to the front of the driving magnet 11, and a back yoke 13 joined to the back of the driving magnet 11. A center yoke 14 is formed integrally with the back yoke 13. The center yoke 14 is disposed inside the driving magnet 11 and the counter yoke 12 and formed to protrude forward (in the Z1 direction) from the back yoke 13. The center yoke 14 may be formed independent of the back yoke 13 and joined to the back yoke 13. The center yoke 14 has a hole 15 passing therethrough in the front-back direction (Z1-Z2 direction). The counter yoke 12, the back yoke 13, and the center yoke 14 are formed of a magnetic material, that is, a magnetic metal material.

The center yoke 14 is a circular columnar member. The outer periphery of the center yoke 14 and the inner periphery of the counter yoke 12 have a magnetic gap G formed therebetween. The magnetic gap G is along the circumference centered on the central axis O. In the magnetic circuit unit 10, the driving magnetic flux F1 generated from the driving magnet 11 travels from the counter yoke 12 across the magnetic gap G and moves along the center yoke 14 and the back yoke 13.

A diaphragm 3 is disposed inside a space forward of the frame 2. The diaphragm 3 has a conical shape. A front edge 2*a* of the frame 2 and an outer edge 3*a* of the diaphragm 3 are joined to each other, with an elastically deformable edge member 4 therebetween. The front edge 2*a* is secured with an adhesive to the edge member 4, and the outer edge 3*a* is also secured with an adhesive to the edge member 4. The frame 2 internally has, in its middle part, an inner fixing portion 2*b*. An outer edge 5*a* of an elastically deformable damper member 5 having a corrugated cross-section is secured with an adhesive to the inner fixing portion 2*b* of the frame 2.

A bobbin 6 is disposed inside the frame 2. The bobbin 6 is a circular cylindrical member centered on the central axis O. An inner edge 3*b* of the diaphragm 3 is secured with an adhesive to an outer periphery of the bobbin 6, and an inner edge 5*b* of the damper member 5 is also secured with an adhesive to the outer periphery of the bobbin 6. A dome-shaped cap 8 that bulges forward is disposed in the center of the diaphragm 3. The cap 8 covers a front opening of the bobbin 6. An edge portion 8*a* of the cap 8 is secured with an adhesive to the front surface of the diaphragm 3.

A voice coil 7 is disposed on an outer periphery of a rear portion of the bobbin 6. A coated wire constituting the voice coil 7 is wound a predetermined number of turns around the outer periphery of the bobbin 6. The voice coil 7 is disposed inside the magnetic gap G in the magnetic circuit unit 10. The magnetic circuit unit 10 and the voice coil 7 constitute a magnetic driving unit.

The diaphragm 3 and the bobbin 6 are supported by elastic deformation of the edge member 4 and the damper member 5 in such a way as to freely vibrate in the front-back direction (Z1-Z2 direction). The diaphragm 3, the cap 8, the bobbin 6, and the voice coil 7 constitute a vibrating unit that vibrates in the front-back direction inside the frame 2.

The speaker 1 includes a detecting unit (vibration detecting unit) 20 that detects vibration of a movable unit. The detecting unit 20 is constituted by the moving magnet 21 and the magnetic sensor 22. The moving magnet 21 is disposed on the outer periphery of the bobbin 6 behind the position at which the inner edge 5*b* of the damper member 5 is bonded. The moving magnet 21 is bonded and secured to the outer periphery of the bobbin 6. The magnetic sensor 22 is disposed in an interior space of the bobbin 6. A base 23 is bonded and secured to a forward face 14*a* of the center yoke 14. The base 23 is a block- or plate-shaped member formed of a non-magnetic material, such as synthetic resin. A wiring board 24 is secured to the base 23, and the magnetic sensor 22 is mounted on the wiring board 24. The wiring board 24 also serves as a base, and these bases (i.e., the base 23 and the wiring board 24) allow the magnetic sensor 22 to be disposed forward of, and at a distance from, the forward face 14*a* of the center yoke 14. A distribution cable 25 electrically connected to the magnetic sensor 22 is connected to the wiring board 24. The distribution cable 25 passes through the hole 15 in the center yoke 14 and extends outward from the back of the magnetic circuit unit 10.

FIG. 1 and FIG. 2 illustrate a cross-section of the speaker 1 taken along a plane parallel to the X-Z plane containing the central axis O. The center of the moving magnet 21 and the center of the magnetic sensor 22 are in the same cross-section containing the central axis O. The driving magnetic flux F1 formed by the magnetic circuit unit 10 thus acts on the magnetic sensor 22 in the radial direction (X direction). As illustrated in FIG. 1, magnetized end faces 21*a* of the moving magnet 21 are oriented in the direction tangential to the bobbin 6 (in the direction parallel to the Y direction) and two end faces 21*a* are magnetized in opposite polarities. Thus, the moving magnetic flux F2 generated by the moving magnet 21 acts on the magnetic sensor 22 substantially in the direction tangential to the bobbin 6 (in the direction parallel to the Y direction).

The magnetic sensor 22 is capable of detecting a change in the direction of a magnetic field, which is a vector quantity, in a plane orthogonal to the central axis O and passing through the center of the magnetic sensor 22 (in a plane parallel to the X-Y plane). The driving magnetic flux F1 generated by the magnetic circuit unit 10 acts on the magnetic sensor 22 in the radial direction (or X direction). In FIG. 1, the magnetic field (or vector quantity) acting on the magnetic sensor 22 on the basis of the driving magnetic flux F1 is denoted by H1. The moving magnetic flux F2 generated by the moving magnet 21 acts on the magnetic sensor 22 in the Y direction. In FIG. 1, the magnetic field (or vector quantity) acting on the magnetic sensor 22 on the basis of the moving magnetic flux F2 is denoted by H2. The magnetic sensor 22 detects the direction of a detection magnetic field Hd, which is a composite vector of the magnetic field H1 and the magnetic field H2. Since the relative position of the magnetic sensor 22 and the magnetic circuit unit 10 does not change, the intensity of the magnetic field H1 acting on the magnetic sensor 22 does not change. On the other hand, the intensity of the magnetic field H2 detected by the magnetic sensor 22 changes as the movable unit vibrates in the front-back direction (Z1-Z2 direction). Therefore, the direction θ of the detection magnetic field Hd (or composite vector), or the angle of the detection magnetic field Hd in a plane orthogonal to the central axis O, changes as the movable unit vibrates.

The magnetic sensor 22 includes at least one magnetoresistive element. The magnetoresistive element is a giant magnetoresistive (GMR) element or a tunneling magnetoresistive (TMR) element including a pinned magnetic layer and a free magnetic layer. The direction of magnetization of the pinned magnetic layer is fixed whereas the direction of the magnetic field in the free magnetic layer follows a change in the direction of the detection magnetic field Hd. An electrical resistance value thus changes in accordance with a change in the relative angle of the fixed magnetic field in the pinned magnetic layer and the magnetization of the free magnetic layer. Alternatively, two Hall elements may be used as the magnetic sensor 22 to detect a change in the direction θ of the detection magnetic field Hd. In this case, the two Hall elements are arranged in such a way that the detection directions cross each other (preferably orthogonal to each other) in a plane orthogonal to the central axis O. Then, one of the Hall elements detects the intensity of the magnetic field H1 and the other Hall element detects the intensity of the magnetic field H2, so that a detection output corresponding to a change in the direction of the vector of the detection magnetic field Hd can be obtained.

A sound output operation of the speaker 1 will now be described.

In the sound output operation, a driving current is applied to the voice coil 7 on the basis of an audio signal output from an audio amplifier. Since the driving magnetic flux F1 generated from the magnetic circuit unit 10 travels across the voice coil 7, an electromagnetic force excited by the driving magnetic flux F1 and the driving current causes the vibrating unit including the bobbin 6 and the diaphragm 3 to vibrate in the front-back direction. This generates sound pressure corresponding to the frequency of the driving current, and enables sound to be output toward the front.

A control unit connected to the speaker 1 performs feedback control on the basis of a detection output from the magnetic sensor 22. By detecting a change in the direction θ of the detection magnetic field Hd with the magnetic sensor 22, the control unit can identify the position of the vibrating unit including the diaphragm 3 in the front-back direction and can also identify the change in this position. For example, the control unit determines an ideal position of the vibrating unit in the front-back direction achieved by application of an audio signal and a change in this ideal position, and also determines an actual position of the vibrating unit and a change in this actual position from the detection output from the magnetic sensor 22. The control unit then calculates the amount of deviation of the actual position and its change from the ideal position and its change. If the amount of deviation exceeds a threshold, a correction signal (offset signal) for correcting the deviation is generated. The correction signal is superimposed on the driving signal (voice current) applied to the voice coil 7. The feedback control thus corrects distortion and deviation of sound output from the speaker 1, and prevents excessive vibration of the diaphragm 3 in the front-back direction.

The magnetic sensor 22 detects the position of the vibrating unit from a change in the angle of the vector of the detection magnetic field Hd obtained from both the driving magnetic flux F1 generated by the magnetic circuit unit 10 and the moving magnetic flux F2 generated by the moving magnet 21. That is, since the detection output is obtained by using the driving magnetic flux F1 from the magnetic circuit unit 10, the driving magnetic flux F1 does not obstruct the detection of the position of the movable unit, and does not cause noise. Feedback control can thus be always performed with high precision and sensitivity.

In the speaker 1 according to the first embodiment illustrated in FIG. 1 and FIG. 2, the magnetic sensor 22 is disposed in a space surrounded by the bobbin 6. The magnetic sensor 22 can thus be freely set at an optimal position in the front-back direction (Z1-Z2 direction). For example, the base 23 (and the wiring board 24, which practically also serves as a base) allows the magnetic sensor 22 to be disposed forward of and at a distance from the front face 14*a* of the center yoke 14, and shortens the distance between the magnetic sensor 22 and the moving magnet 21 in the front-back direction. Shortening this distance allows the magnetic sensor 22 to easily detect the moving magnetic flux F2 generated from the moving magnet 21 and enables detection of vibration of the movable unit with high sensitivity. When the magnetic sensor 22 is disposed forward of and at a distance from the front face 14*a* of the center yoke 14, the moving magnet 21 can also be disposed at a distance from the magnetic circuit unit 10 in the forward direction (Z1 direction). Therefore, even when the amplitude of the movable unit in the front-back direction increases, the moving magnet 21 is less likely to hit the magnetic circuit unit 10.

When the magnetic sensor 22 is disposed in the space surrounded by the bobbin 6 and the moving magnet 21 is disposed on the outer surface of the bobbin 6, even if an increase in the amplitude of the vibrating unit causes the moving magnet 21 and the damper member 5 to move backward significantly to the position indicated by (m) in FIG. 2, the moving magnet 21 and the damper member 5 can be prevented from hitting the magnetic sensor 22.

It is thus possible to increase the amplitude of the vibrating unit including the diaphragm 3 in the front-back direction and increase sound output.

Figure 3:
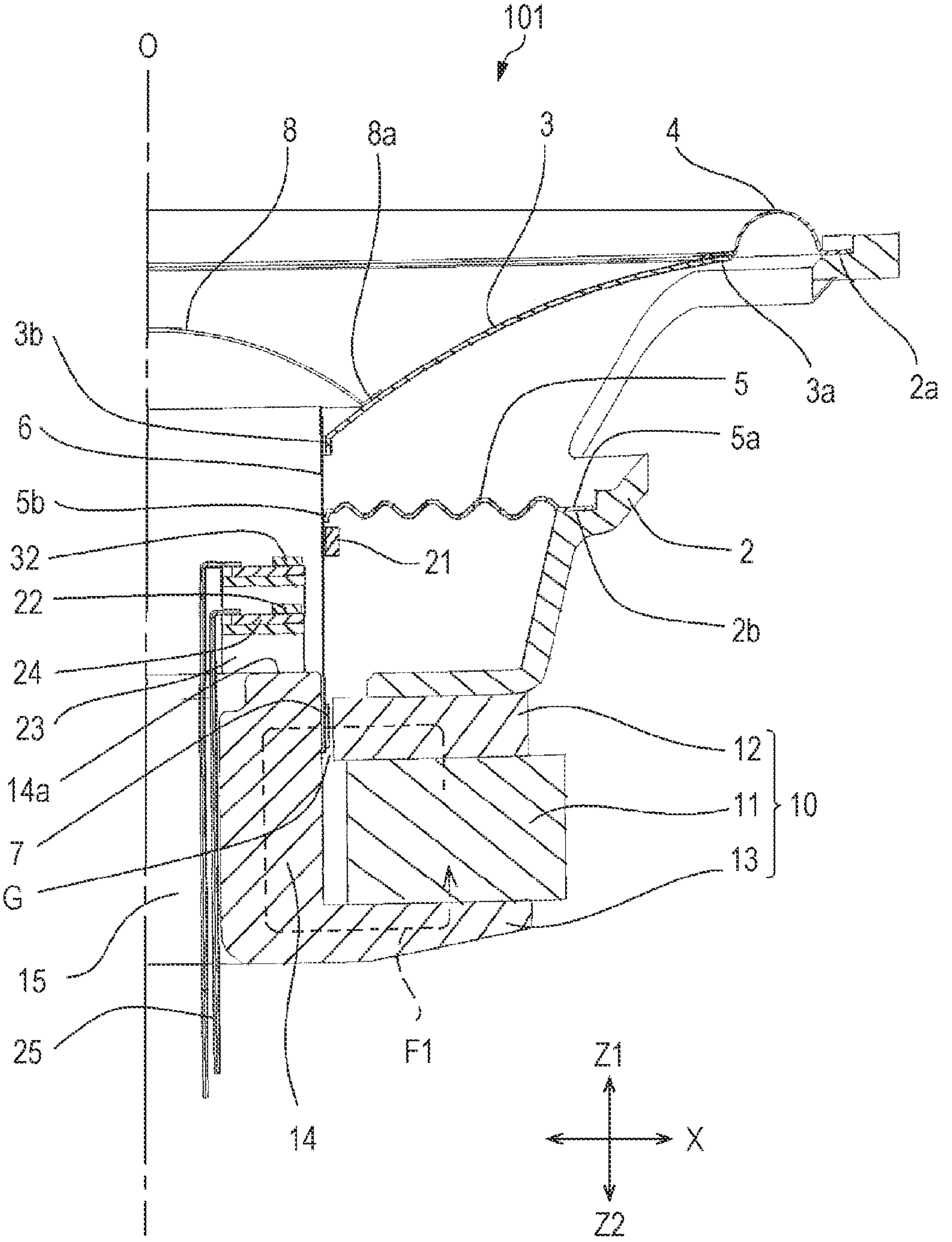
FIG. 3 is a half sectional view of a speaker according to a second embodiment of the present invention.

FIG. 3 illustrates a speaker 101 according to a second embodiment of the present invention.

The speaker 101 includes a plurality of magnetic sensors, which are two magnetic sensors 22 and 32 in the present embodiment. The centers of the two magnetic sensors 22 and 32 and the center of the moving magnet 21 are in the same cross-section containing the central axis O. The magnetic sensor 22 and the magnetic sensor 32 are supported by the base 23 while being spaced apart in the front-back direction (Z1-Z2 direction). Both the magnetic sensor 22 and the magnetic sensor 32 are disposed forward of and at a distance from the front face 14*a* of the center yoke 14.

In the speaker 101 illustrated in FIG. 3, the two magnetic sensors 22 and 32 spaced apart in the front-back direction are both capable of detecting the moving magnetic flux F2 from the moving magnet 21. This can widen the range of detecting the movable unit in the front-back direction. A magnetic sensor is designed to detect a change in the direction θ of the detection magnetic field Hd (composite vector) illustrated in FIG. 1. If the moving magnet 21 is disposed forward of the magnetic sensor at a considerable distance therefrom and the magnetic field H2 is very small, the angle θ representing the direction of the detection magnetic field Hd is substantially zero and the position of the moving magnet 21 that moves further forward cannot be detected. Also, if the moving magnet 21 moves backward (in the Z2 direction) from the magnetic sensor, the direction of the magnetic field H2 is reversed and the magnetic sensor 22 cannot detect the angle θ. The range in which a single magnetic sensor can detect the position of the moving magnet 21 in the front-back direction is limited. With a plurality of magnetic sensors 22 and 32 spaced apart in the front-back direction as illustrated in FIG. 3, the movable unit can be detected over a wide range in the front-back direction.

Figure 4:
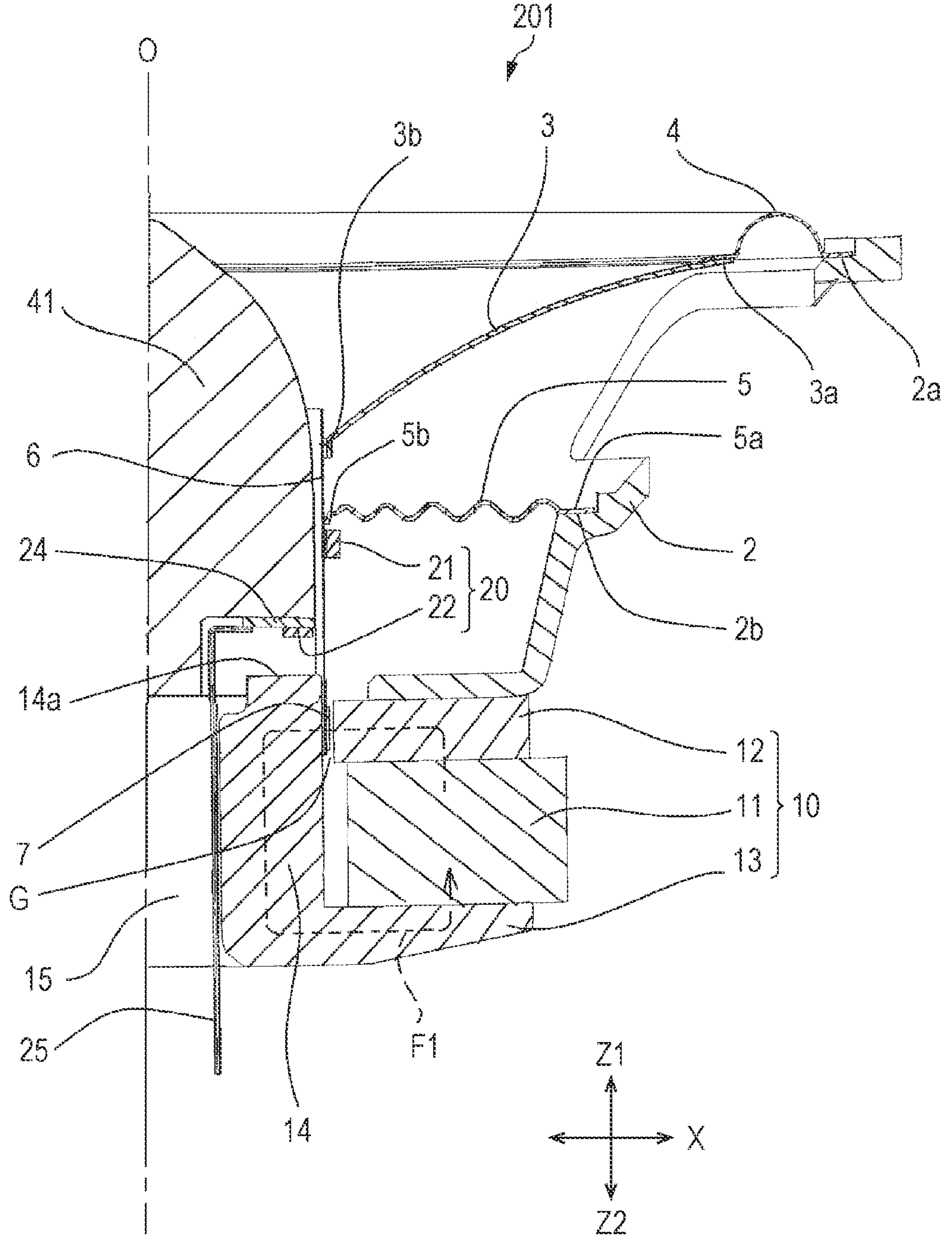
FIG. 4 is a half sectional view of a speaker according to a third embodiment of the present invention.

FIG. 4 illustrates a speaker 201 according to a third embodiment of the present invention.

The speaker 201 includes a phase plug 41 secured forward of the center yoke 14 of the magnetic circuit unit 10. The wiring board 24 is secured to the phase plug 41 and the magnetic sensor 22 is mounted on the wiring board 24. In the present embodiment, without using the base 23 other than the wiring board 24 (which also serves as a base), the magnetic sensor 22 can be disposed forward of and at a distance from the front face 14*a* of the center yoke 14 in the space surrounded by the bobbin 6. Instead of the phase plug 41, a tweeter that outputs high-frequency sound may be secured forward of the center yoke 14, so as to allow the magnetic sensor 22 to be secured to the tweeter.

The speaker 201 illustrated in FIG. 4 can also include a plurality of magnetic sensors 22 and 32, and can also include a plurality of moving magnets 21.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A speaker comprising:

a frame;

a vibrating unit supported by the frame, the vibrating unit including a diaphragm and a bobbin secured to the diaphragm, the diaphragm being supported by the frame in such a way as to freely vibrate;

a magnetic driving unit configured to drive the vibrating unit, the magnetic driving unit including a voice coil secured to the bobbin and a magnetic circuit unit configured to form a magnetic flux travelling across the voice coil; and a detecting unit configured to detect movement of the vibrating unit, wherein the detecting unit includes a moving magnet secured to the vibrating unit and a magnetic sensor configured to detect a magnetic flux generated from the moving magnet, and the magnetic sensor is secured in a space surrounded by the bobbin;

wherein a phase plug is secured forward of an end face of a center yoke constituting the magnetic circuit unit, and the magnetic sensor is secured to the phase plug at a distance from the end face.

2. The speaker according to claim 1, wherein the detecting unit further includes a second magnetic sensor spaced from the magnetic sensor, the second magnetic sensor configured to detect a magnetic flux generated from the moving magnet.

3. The speaker according to claim 1, wherein the center yoke constituting the magnetic circuit unit has a hole formed therethrough in a vibrating direction of the vibrating unit, and a distribution cable connected to the magnetic sensor passes through the hole and extends out of the magnetic circuit unit.

4. The speaker according to claim 1, wherein a direction of a driving magnetic flux applied from the magnetic circuit unit to the magnetic sensor crosses a direction of a moving magnetic flux applied from the moving magnet to the magnetic sensor; and the magnetic sensor provides a detection output based on a change in a direction of a composite vector of the driving magnetic flux and the moving magnetic flux.

5. The speaker according to claim 1, wherein the moving magnet is disposed outside the bobbin.

6. A speaker comprising:

a frame;

a vibrating unit supported by the frame, the vibrating unit including a diaphragm and a bobbin secured to the diaphragm, the diaphragm being supported by the frame in such a way as to freely vibrate;

a magnetic driving unit configured to drive the vibrating unit, the magnetic driving unit including a voice coil secured to the bobbin and a magnetic circuit unit configured to form a magnetic flux travelling across the voice coil; and a detecting unit configured to detect movement of the vibrating unit, wherein the detecting unit includes a moving magnet secured to the vibrating unit and a magnetic sensor configured to detect a magnetic flux generated from the moving magnet, and the magnetic sensor is secured in a space surrounded by the bobbin; and a direction of a driving magnetic flux applied from the magnetic circuit unit to the magnetic sensor crosses a direction of a moving magnetic flux applied from the moving magnet to the magnetic sensor, and the magnetic sensor provides a detection output based on a change in a direction of a composite vector of the driving magnetic flux and the moving magnetic flux.

7. The speaker according to claim 6, wherein a base is secured to an end face of a center yoke constituting the magnetic circuit unit, and the magnetic sensor is secured to the base at a distance from the end face.

8. The speaker according to claim 6, wherein a phase plug is secured forward of an end face of a center yoke constituting the magnetic circuit unit, and the magnetic sensor is secured to the phase plug at a distance from the end face.

9. The speaker according to claim 6, wherein a center yoke constituting the magnetic circuit unit has a hole formed therethrough in a vibrating direction of the vibrating unit, and a distribution cable connected to the magnetic sensor passes through the hole and extends out of the magnetic circuit unit.

10. The speaker according to claim 6, wherein the moving magnet is disposed outside the bobbin.

11. The speaker according to claim 6, wherein the detecting unit further includes a second magnetic sensor spaced from the magnetic sensor, the second magnetic sensor configured to detect a magnetic flux generated from the moving magnet.

* * * * *